US012337725B2

(12) United States Patent
Jeong et al.

(10) Patent No.: US 12,337,725 B2
(45) Date of Patent: Jun. 24, 2025

(54) APPARATUS AND METHOD FOR CONTROLLING REGENERATION OF FUEL CELL VEHICLE

(71) Applicants: Hyundai Motor Company, Seoul (KR); Kia Corporation, Seoul (KR)

(72) Inventors: Seong Cheol Jeong, Suwon-si (KR); Joo Yeon Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 69 days.

(21) Appl. No.: 18/491,740

(22) Filed: Oct. 20, 2023

(65) Prior Publication Data

US 2024/0190254 A1    Jun. 13, 2024

(30) Foreign Application Priority Data

Dec. 9, 2022 (KR) ................ 10-2022-0171696

(51) Int. Cl.
*B60L 7/18* (2006.01)
*B60L 53/24* (2019.01)
*B60L 58/12* (2019.01)
*H01M 8/04029* (2016.01)

(52) U.S. Cl.
CPC ............. *B60L 7/18* (2013.01); *B60L 53/24* (2019.02); *B60L 58/12* (2019.02); *H01M 8/04029* (2013.01); *B60L 2240/545* (2013.01)

(58) Field of Classification Search
CPC ...... B60L 1/003; B60L 1/02; B60L 2240/545; B60L 50/72; B60L 53/24; B60L 58/12; B60L 58/33; B60L 58/40; B60L 7/18; H01M 16/006; H01M 2220/20; H01M 2250/20; H01M 8/04029
See application file for complete search history.

(56) References Cited

U.S. PATENT DOCUMENTS

| 8,807,446 | B2 * | 8/2014 | Han | B60L 1/02 |
| | | | | 219/202 |
| 10,036,288 | B2 * | 7/2018 | Leone | B60L 1/02 |
| 10,826,094 | B2 * | 11/2020 | Jeong | H01M 8/04768 |
| 10,964,965 | B2 * | 3/2021 | Park | H02J 7/0068 |
| 2009/0183936 | A1 * | 7/2009 | Kim | H01M 8/04067 |
| | | | | 180/68.4 |
| 2011/0087389 | A1 * | 4/2011 | Burleigh | B60L 58/33 |
| | | | | 701/22 |
| 2019/0067945 | A1 * | 2/2019 | Hierl | H02J 3/46 |

(Continued)

*Primary Examiner* — Carl C Staubach
(74) *Attorney, Agent, or Firm* — Slater Matsil, LLP

(57) ABSTRACT

In an embodiment a regenerative braking control apparatus includes a fuel cell stack configured to provide energy to a driving motor of the vehicle, a cathode oxygen depletion (COD) heater configured to remove gas remaining in the fuel cell stack, a high voltage battery configured to supply power to the driving motor or to be charged by using power generated by the driving motor through regenerative braking and a processor configured to calculate a reference state-of-charge (SOC) based on an expected driving route, to calculate a limit power for the COD heater based on an operating state of a cooling device for cooling the COD heater when a SOC of the high voltage battery is greater than or equal to the reference SOC and to calculate consumable power of the COD heater based on the limit power of the COD heater.

20 Claims, 10 Drawing Sheets

(56) References Cited

U.S. PATENT DOCUMENTS

| | | | | |
|---|---|---|---|---|
| 2019/0143958 A1* | 5/2019 | Jang | ............... | B60W 20/14 |
| | | | | 701/22 |
| 2019/0181476 A1* | 6/2019 | Jeong | ............... | H01M 8/04358 |
| 2022/0173415 A1* | 6/2022 | Park | ............... | H01M 8/04992 |
| 2023/0150398 A1* | 5/2023 | Kim | ............... | H01M 10/48 |
| | | | | 429/429 |
| 2024/0025410 A1* | 1/2024 | Han | ............... | B60W 50/0097 |
| 2024/0290996 A1* | 8/2024 | Jang | ............... | H01M 8/04029 |
| 2025/0070206 A1* | 2/2025 | Kwon | ............... | H01M 8/04044 |

* cited by examiner

APPARATUS AND METHOD FOR CONTROLLING REGENERATION OF FUEL CELL VEHICLE

CROSS-REFERENCE TO RELATED APPLICATIONS

This application claims the benefit of priority to Korean Patent Application No. 10-2022-0171696, filed in the Korean Intellectual Property Office on Dec. 9, 2022, the entire contents of which are incorporated herein by reference.

TECHNICAL FIELD

The present disclosure relates to a regenerative braking control apparatus of a fuel cell vehicle, and a method therefor, and more particularly to a technology for variably controlling the consumption amount of regenerative braking energy.

BACKGROUND

A fuel cell-based vehicle operates driving devices of the vehicle by using energy generated by a fuel cell. The fuel cell generates electricity by using a chemical reaction between hydrogen and oxygen, and a driving motor rotates by using the electricity generated by the fuel cell.

To increase energy efficiency, the fuel cell-based vehicle may use a regenerative braking technology that converts braking energy by a brake pedal into electrical energy and charges a battery.

The technology has been proposed to efficiently use regenerative braking energy and prevent overvoltage charging in the battery. However, in many cases, it is insufficient to more accurately determine the optimal consumption of regenerative braking energy.

Moreover, in a conventional method for consuming regenerative braking energy, it is difficult to adjust the consumption of regenerative braking.

Furthermore, because a limit power of a device consuming regenerative braking is not considered, the conventional method of consuming regenerative braking energy has low stability.

SUMMARY

Embodiments solve the above-mentioned problems occurring in the prior art while advantages achieved by the prior art are maintained intact.

An embodiment of the present disclosure provides a regenerative braking control apparatus of a fuel cell vehicle that is capable of more accurately estimating energy generated by regenerative braking and preventing overcharging of a battery, and a method therefor.

An embodiment of the present disclosure provides a regenerative braking control apparatus of a fuel cell vehicle that is capable of more accurately controlling energy consumed by a cathode oxygen depletion (COD) heater in a process of consuming energy generated by regenerative braking, and a method therefor.

An embodiment of the present disclosure provides a regenerative braking control apparatus of a fuel cell vehicle that is capable of improving stability in consideration of the limitation of power consumed by a COD heater, and a method therefor.

According to an embodiment of the present disclosure, a regenerative braking control apparatus of a fuel cell vehicle includes a fuel cell stack that provides energy to a driving motor for driving a vehicle, a cathode oxygen depletion (COD) heater that removes gas remaining in the fuel cell stack, a high voltage battery that supplies power to the driving motor or is charged by using power generated by the driving motor through regenerative braking, and a processor that calculates a reference state-of-charge (SOC) based on an expected driving route, calculates limit power of the COD heater based on an operating state of a cooling device for cooling the COD heater when SOC of the high voltage battery is not less than the reference SOC, and calculates consumable power of the COD heater based on the limit power of the COD heater.

According to an embodiment, the processor may calculate the reference SOC based on a descending section of a road within a predetermined unit section on the expected driving route and a slope of the descending section.

According to an embodiment, the processor may calculate a level of the reference SOC based on a change amount of regenerative braking energy during a predetermined first unit time.

According to an embodiment, the processor may use a change in the SOC of the high voltage battery during a predetermined second unit time.

According to an embodiment, the processor may calculate the limit power to be low as a coolant temperature of the cooling device decreases.

According to an embodiment, the processor may calculate the limit power to be high as a coolant amount provided to the COD heater increases.

According to an embodiment, the processor may calculate the limit power to be high in proportion to RPM of a coolant pump of the cooling device.

According to an embodiment, the processor may calculate the consumable power of the COD heater in proportion to the limit power when the limit power of the COD heater is not less than a predetermined threshold value, and may consume power generated by the regenerative braking within a range of the consumable power through the COD heater.

According to an embodiment, the processor may drive the cooling device to increase cooling intensity in proportion to the consumable power.

According to an embodiment, the processor may increase revolutions per minute (RPM) of a coolant pump that controls a coolant flow path of the COD heater when the limit power of the COD heater is less than the threshold value.

According to an embodiment, the processor may close a flow path between the fuel cell stack and an air compressor and may increase RPM of the air compressor when the limit power of the COD heater is less than the threshold value.

According to an embodiment of the present disclosure, a regenerative braking control method of a fuel cell vehicle includes calculating a reference SOC based on an expected driving route, calculating limit power of a COD heater based on an operating state of a cooling device for cooling the COD heater when SOC of the high voltage battery is not less than the reference SOC, and calculating consumable power of the COD heater based on the limit power of the COD heater.

According to an embodiment, the calculating of the reference SOC may include using a descending section of a road within a predetermined unit section on the expected driving route and a slope of the descending section.

According to an embodiment, the calculating of the reference SOC may include using a change amount of regenerative braking energy during a predetermined first unit time.

According to an embodiment, the calculating of the reference SOC may include using a change in the SOC of the high voltage battery during a predetermined second unit time.

According to an embodiment, the calculating of the limit power may include calculating the limit power to be low as a coolant temperature of the cooling device decreases.

According to an embodiment, the calculating of the limit power may further include calculating the limit power to be high as a coolant amount provided to the COD heater increases.

According to an embodiment, the calculating of the limit power may further include calculating the limit power to be high in proportion to RPM of a coolant pump of the cooling device.

According to an embodiment, the calculating of the consumable power of the COD heater may include calculating the consumable power of the COD heater in proportion to the limit power when the limit power of the COD heater is not less than a predetermined threshold value, and may further include after calculating the consumable power, consuming power generated by the regenerative braking within a range of the consumable power through the COD heater.

According to an embodiment, the consuming of the power generated by the regenerative braking through the COD heater may further include driving the cooling device to increase cooling intensity in proportion to the consumable power.

According to an embodiment, the method may further include increasing RPM of a coolant pump that controls a coolant flow path of the COD heater when the limit power of the COD heater is less than the threshold value.

According to an embodiment, the method may further include closing a flow path between the fuel cell stack and an air compressor and increasing RPM of the air compressor when the limit power of the COD heater is less than the threshold value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
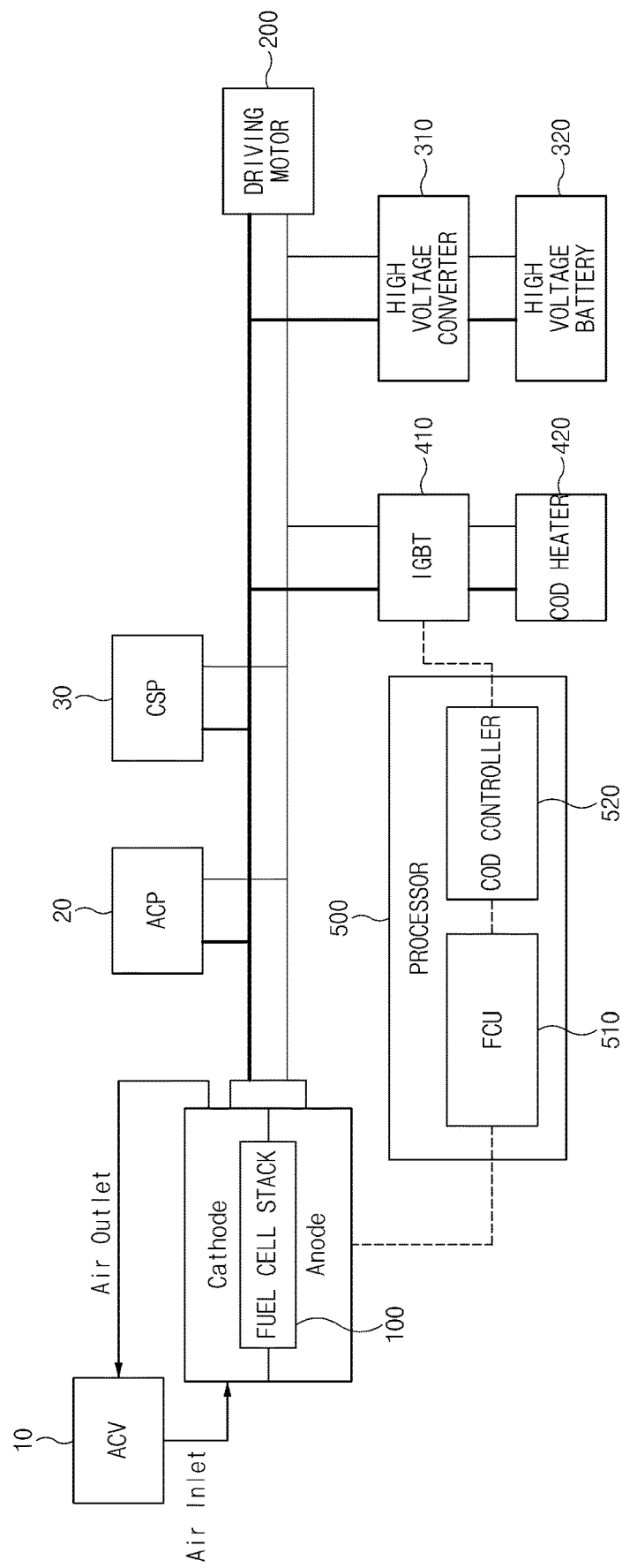
FIG. 1 is a block diagram illustrating a regenerative braking control system, according to an embodiment of the present disclosure.

Hereinafter, some embodiments of the present disclosure will be described in detail with reference to the accompanying drawings. In adding reference numerals to components of each drawing, it should be noted that the same components have the same reference numerals, although they are indicated on another drawing. In describing embodiments of the present disclosure, detailed descriptions associated with well-known functions or configurations will be omitted when they may make subject matters of the present disclosure unnecessarily obscure.

In describing components of embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 10.

FIG. 1 is a block diagram illustrating a regenerative braking control system, according to an embodiment of the present disclosure.

Referring to FIG. 1, a regenerative braking control system according to an embodiment of the present disclosure may be implemented inside a fuel cell vehicle. At this time, the regenerative braking system may be integrated with internal control units of a vehicle and may be implemented with a separate device so as to be connected to control units of the vehicle by a separate connection means.

A fuel cell stack 100 may convert chemical energy into electrical energy through an electrochemical reaction between fuel gas and oxygen. The fuel cell stack 100 may include one or more unit cells. The unit cell may generate electric energy by inducing oxidation and reduction reactions by receiving hydrogen gas included in the fuel gas and air. The unit cell may be protected from the outside by an end plate. The unit cell may include a membrane & electrode assembly (MEA) for oxidizing/reducing hydrogen gas and air, and at least one separator for supplying fuel gas and air to the MEA.

A driving motor 200 may receive power from the fuel cell stack 100 or a high voltage battery 320 to drive a vehicle. Also, the driving motor 200 may generate power through regenerative braking.

The high voltage battery 320 may be charged by the power generated by the fuel cell stack 100, and may be charged by receiving power generated by the driving motor 200 operating as a generator during vehicle braking in a regenerative braking process. The voltage charged in the high voltage battery 320 may assist the output of the driving motor 200.

A high voltage converter 310 may boost the voltage charged in the high voltage battery 320 to a voltage required by the driving motor 200.

A COD heater 420 may be used to exhaust gas remaining on a cathode side of the fuel cell stack 100, for example, oxygen. The COD heater 420 may prevent deterioration of the fuel cell stack 100 by removing oxygen and hydrogen remaining in the fuel cell stack 100 at the moment of the startup and shutdown of a vehicle.

An insulated gate bipolar transistor (IGBT) switch 410 may be used to control the timing at which power is supplied to the COD heater 420, and may be operated under the control of a COD controller 520 to control driving of the COD heater 420.

An air control valve (ACV) 10 may control the amount of air supplied to the fuel cell stack 100.

An air compressor (ACP) 20 may supply air to the fuel cell stack 100.

A coolant stack pump (CSP) 30 may circulate coolant for cooling the fuel cell stack 100.

The processor 500 may include a fuel-cell control unit (FCU) 510 and the COD controller 520.

The FCU 510 may supply hydrogen to the fuel cell stack 100 by adjusting a supply/block valve of hydrogen. Moreover, the FCU 510 may calculate the consumable power of the COD heater 420 during regenerative braking.

The COD controller 520 may drive the COD heater 420 in response to the consumable power of the COD heater 420 calculated by the FCU 510. To this end, the COD controller 520 may adjust a turn-on duty of the IGBT switch 410.

Hereinafter, an operation of controlling a procedure of consuming regenerative braking energy by using the COD heater 420 by the FCU 510 and the COD controller 520 will be described as being performed by the processor 500.

The processor 500 may calculate a reference state-of-charge (SOC) based on an expected driving route. The reference SOC may be a criterion for determining whether power generated through regenerative braking is capable of being consumed through the COD heater 420, and may be used to be compared with the SOC of the high voltage battery 320.

Furthermore, when the SOC of the high voltage battery 320 is not less than the reference SOC, the processor 500 may calculate the limit power of the COD heater 420. The limit power of the COD heater 420 may be calculated based on an operating state of a cooling device for cooling the COD heater 420.

Besides, when the limit power of the COD heater 420 is not less than a predetermined threshold value, the processor 500 may calculate the consumable power of the COD heater 420 so as to be proportional to the limit power.

Also, the processor 500 may consume power generated by regenerative braking through the COD heater 420 within a consumable power range.

Figure 2:
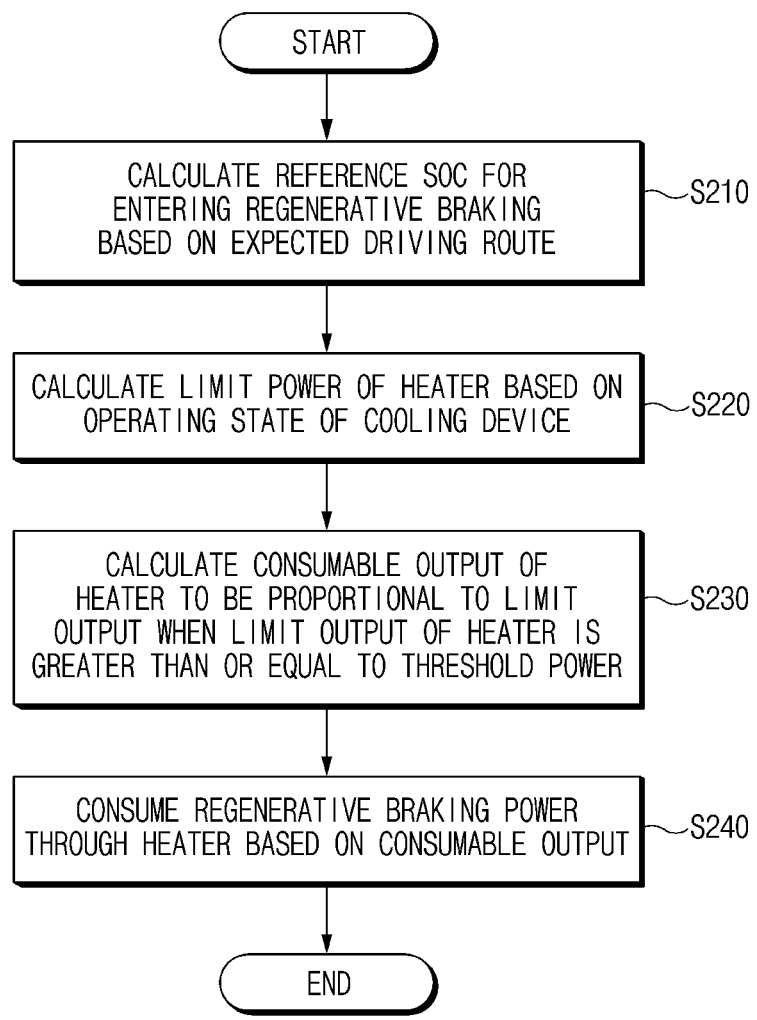
FIG. 2 is a flowchart illustrating a regenerative braking control method, according to an embodiment of the present disclosure.

FIG. 2 is a flowchart illustrating a regenerative braking control method, according to an embodiment of the present disclosure. It may be understood that an embodiment of FIG. 2 is controlled by the processor 500 of the regenerative braking control apparatus of a fuel cell vehicle.

Hereinafter, a regenerative braking control method according to an embodiment of the present disclosure will be described with reference to FIGS. 1 and 2.

In S210, the processor 500 may calculate a reference SOC based on an expected driving route.

The expected driving route may be a route on which a vehicle equipped with a regenerative braking control apparatus is scheduled to travel, and may be road information to a destination on a navigation system. Also, the expected driving route may be road information within a specific time or within a specific distance.

In S220, the processor 500 may calculate the limit power of the COD heater 420 based on the operating state of a cooling device.

Figure 3:
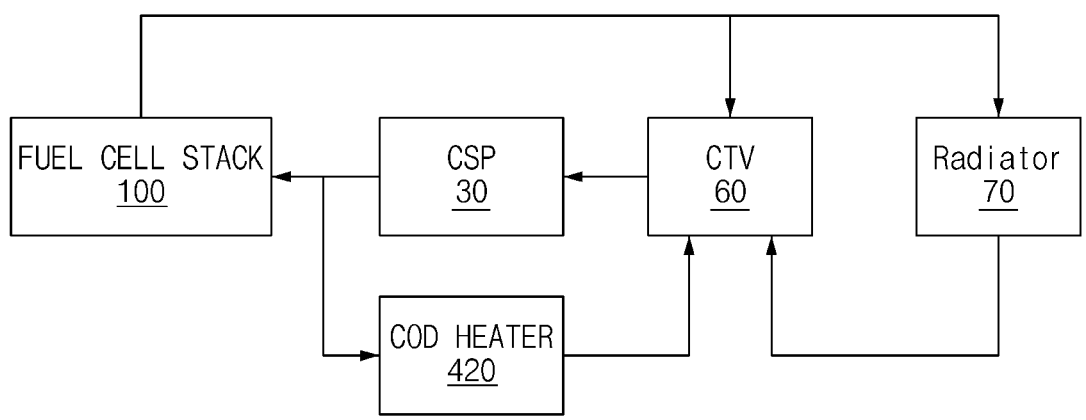
FIG. 3 is a block diagram showing a configuration of a cooling device, according to an embodiment of the present disclosure.

The cooling device may be a device for cooling the COD heater 420 and may include components shown in FIG. 3.

FIG. 3 is a block diagram showing a configuration of a cooling device, according to an embodiment of the present disclosure.

As shown in FIG. 3, a device for cooling the COD heater 420 may include the CSP 30, a coolant temperature-control valve (CTV) 60, and a radiator 70.

The CTV 60 may be a 3-way valve, and may control the amount of coolant flowing into the radiator 70 by controlling the opening degree to control the temperature of the fuel cell stack 100. The CSP 30 and the CTV 60 may be controlled under the control of the COD controller 520 shown in FIG. 1.

The operating state of the cooling device may include at least one of the temperature of the coolant, the opening degree of the CTV 60, or revolutions per minute (RPM) of the CSP 30.

On the basis of the operating state of the cooling device, the processor 500 may calculate maximum power, which is capable of being consumed through the COD heater 420, as limit power.

In S230, when the limit power of the COD heater 420 is not less than predetermined threshold power, the processor 500 may calculate the consumable power of the COD heater 420 so as to be proportional to the limit power.

The consumable power of the COD heater 420 may mean power to be consumed by the COD heater 420 among power generated by regenerative braking.

The consumable power of the COD heater 420 may be the same as the limit power of the COD heater 420. Alternatively, the consumable power of the COD heater 420 may be power calculated in proportion to the limit power of the COD heater 420.

In S240, the processor 500 may consume regenerative braking power through the COD heater 420 based on consumable power. That is, the processor 500 may allow the COD heater 420 to consume regenerative braking energy depending on the amount of consumable power.

To this end, the processor 500 may adjust the amount of power provided to the COD heater 420 by using the IGBT switch 410. According to an embodiment, the processor 500 may adjust the duty ratio of the IGBT switch 410 to adjust power provided to the COD heater 420.

Figure 4:
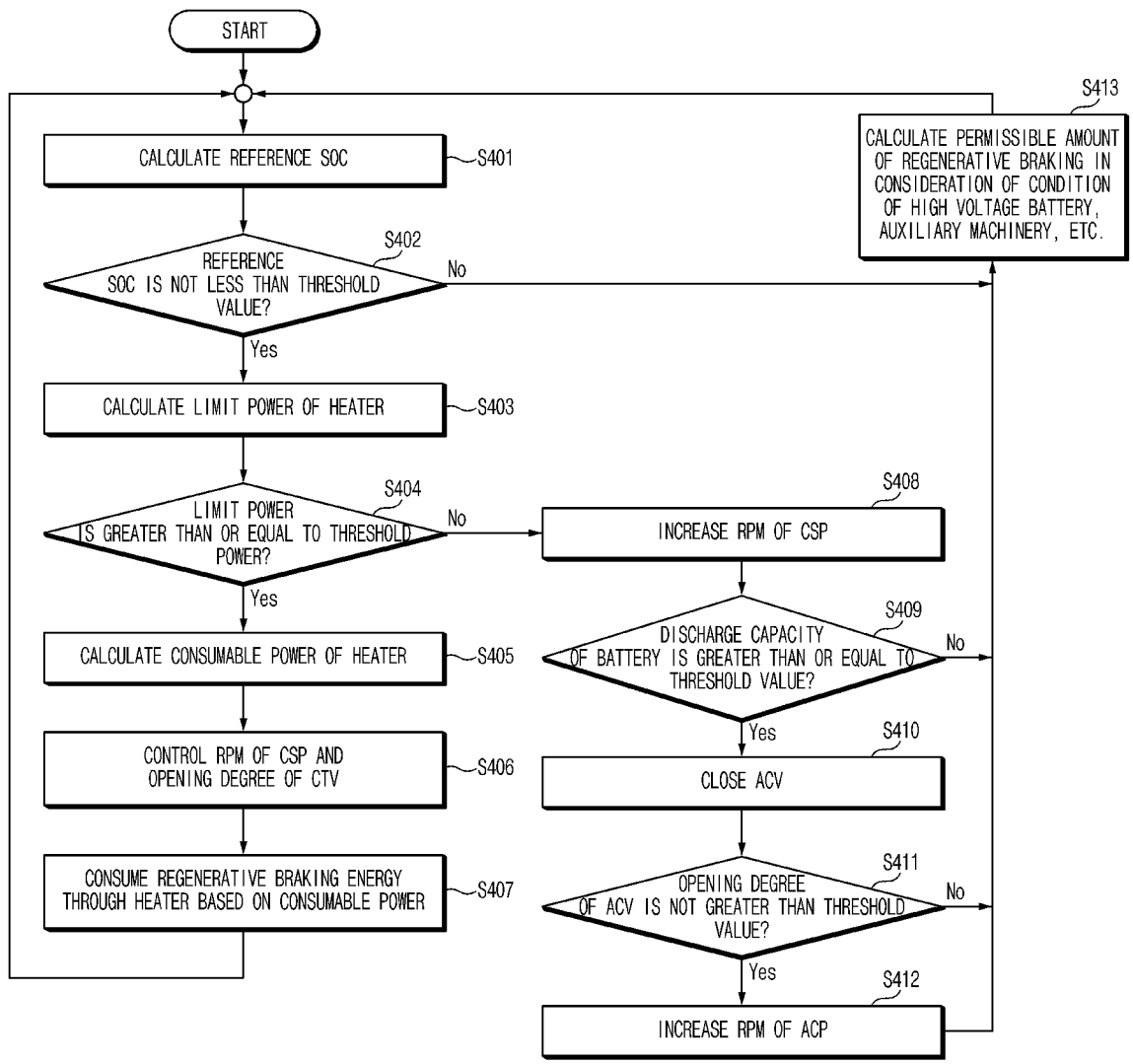
FIG. 4 is a flowchart illustrating a regenerative braking control method of a fuel cell vehicle, according to another embodiment of the present disclosure.

FIG. 4 is a flowchart illustrating a regenerative braking control method of a fuel cell vehicle, according to another embodiment of the present disclosure.

According to an embodiment of the present disclosure, a regenerative braking control method of a fuel cell vehicle will be described with reference to FIG. 4.

In S401, the processor 500 may calculate a reference SOC.

A procedure for calculating the reference SOC may include a procedure for calculating a reference SOC based on the expected driving route of S210 shown in FIG. 2. Besides, the processor 500 may calculate the reference SOC based on a driving factor related to vehicle driving.

This will be described in detail in the following.

The processor 500 may calculate the reference SOC based on the driving factor. The driving factor may include at least one of expected driving route information, a change amount of regenerative braking energy, or a change amount of SOC of a high voltage battery.

The processor 500 may determine a first driving factor based on the expected driving route. For example, the processor 500 may calculate a first driving factor to be high in proportion to a length of a descending section of a road within a predetermined unit section on the expected driving route. Alternatively, the processor 500 may calculate the first driving factor to be high in proportion to a slope in the descending section within the predetermined unit section on the expected driving route. Alternatively, the processor 500 may calculate the level of the first driving factor in consideration of a length and slope of the descending section within the predetermined unit section.

Moreover, the processor 500 may determine a second driving factor based on the rate of increase in regenerative braking energy. For example, when the regenerative braking energy increases during the predetermined first unit time, the processor 500 may set a second driving factor to be high.

Furthermore, the processor 500 may determine a third driving factor based on the SOC change of the high voltage battery. For example, when the SOC of the high voltage battery increases during a predetermined second unit time, the processor 500 may set a third driving factor to be high.

Figure 5:
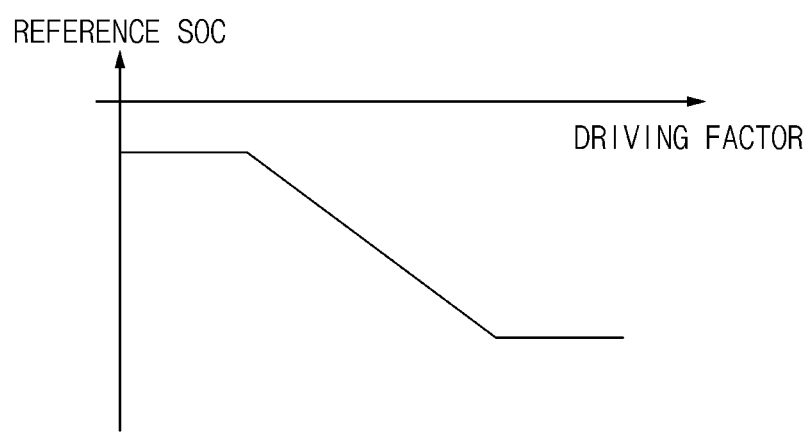
FIG. 5 is a diagram for describing a method of setting a reference SOC based on a driving factor.

FIG. 5 is a diagram for describing a method of setting a reference SOC based on a driving factor.

Referring to FIG. 5, the processor 500 may set the level of the reference SOC to be low in proportion to the first or third driving factors. The processor 500 may set the level of the reference SOC by using one of first and third driving factors. Alternatively, the level of the reference SOC may be set based on a driving factor obtained by summing or multiplying two or more driving factors selected from among the first and third driving factors.

As such, the processor 500 may set the level of the reference SOC to be low in proportion to the amount of regenerative braking energy expected based on an expected driving route, a change amount of regenerative braking energy, or a change amount of SOC of a high voltage battery.

In S402 and S403, the processor 500 may calculate the limit power of the COD heater 420.

The processor 500 may calculate the limit power of the COD heater 420 based on the operating state of a cooling device. An embodiment of calculating the limit power of the COD heater 420 will be described with reference to FIGS. 6 to 8.

Figure 6:
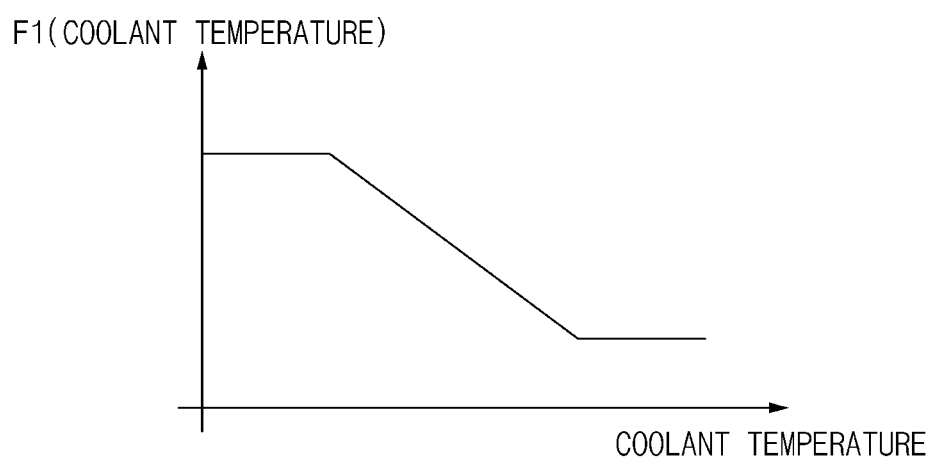
FIG. 6 is a diagram for describing an embodiment of calculating limit power based on a coolant temperature.

FIG. 6 is a diagram for describing an embodiment of calculating the limit power based on a coolant temperature.

Referring to FIG. 6, the processor 500 may obtain a function value of a first function f1 whose level decreases as the coolant temperature increases.

Figure 7:
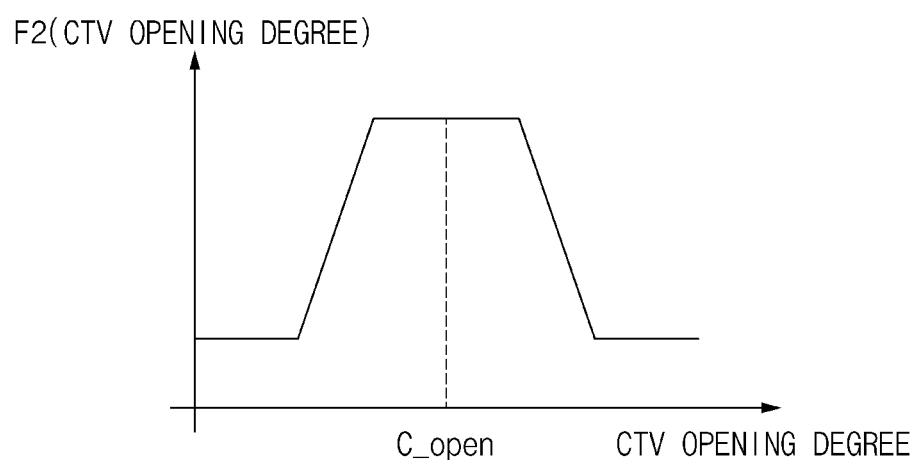
FIG. 7 is a diagram for describing an embodiment of calculating limit power based on an opening degree of a CTV.

FIG. 7 is a diagram for describing an embodiment of calculating the limit power based on an opening degree of a CTV. FIG. 7 shows control of the opening degree of a CTV in which the flow rate of coolant is determined in a direction of the radiator 70 and the COD heater 420 depending on the opening degree of the CTV. In particular, FIG. 7 illustrates an embodiment in which the amount of coolant provided in a direction of the COD heater 420 increases until an opening amount becomes a specific opening amount C_open, and the amount of coolant provided in a direction of the COD heater 420 is reduced when the opening amount exceeds the specific opening amount C_open.

Referring to FIG. 7, the processor 500 may obtain a function value of a second function f2 depending on the opening degree of the CTV. That is, the processor 500 may obtain a function value of a second function f2 whose level increases as the amount of coolant provided to the COD heater 420 increases due to the opening degree of the CTV 60.

Figure 8:
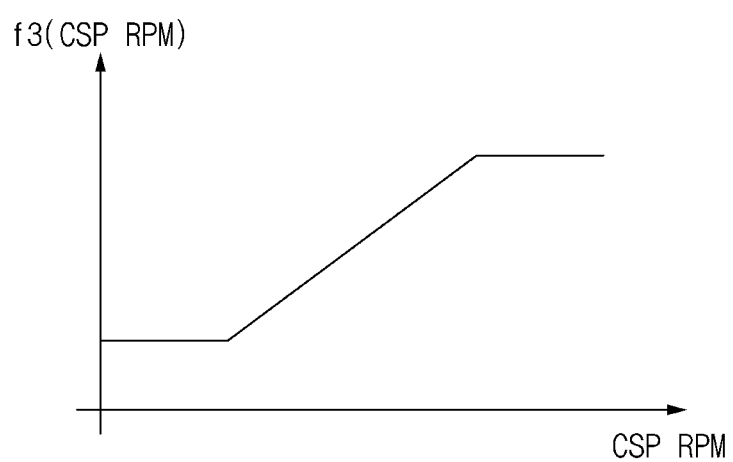
FIG. 8 is a diagram for describing an embodiment of calculating limit power based on RPM of CSP.

FIG. 8 is a diagram for describing an embodiment of calculating the limit power based on RPM of CSP.

Referring to FIG. 8, the processor 500 may obtain a function value of a third function f3 whose level increases as the RPM of the CSP 30 increases.

Hereinafter, the function value of the first function f1 will be referred to as a "first function value"; a function value of the second function f2 will be referred to as a "second function value"; and, a function value of the third function f3 will be referred to as a "third function value".

The processor 500 may calculate limit power by using at least one of the first and third function values.

For example, the processor 500 may calculate limit power of the COD heater 420 in proportion to the first function value. Alternatively, the processor 500 may calculate the limit power of the COD heater 420 in proportion to the second function value, or may calculate the limit power of the COD heater 420 in proportion to the third function value.

Alternatively, the limit power of the COD heater 420 may be calculated based on at least two or more function values among the first function value and the third function value. For example, the processor 500 may calculate the limit power of the COD heater 420 in proportion to a result of an operation of multiplying a first function value to a third function value. Alternatively, the processor 500 may calculate the limit power of the COD heater 420 in proportion to a result of an operation of adding the first function value to the third function value.

In S404 and S405, when the limit power of the COD heater 420 is not less than predetermined threshold power, the processor 500 may calculate consumable power of the COD heater.

As the limit power of the COD heater 420 increases, the processor 500 may calculate the consumable power of the COD heater 420.

Figure 9:
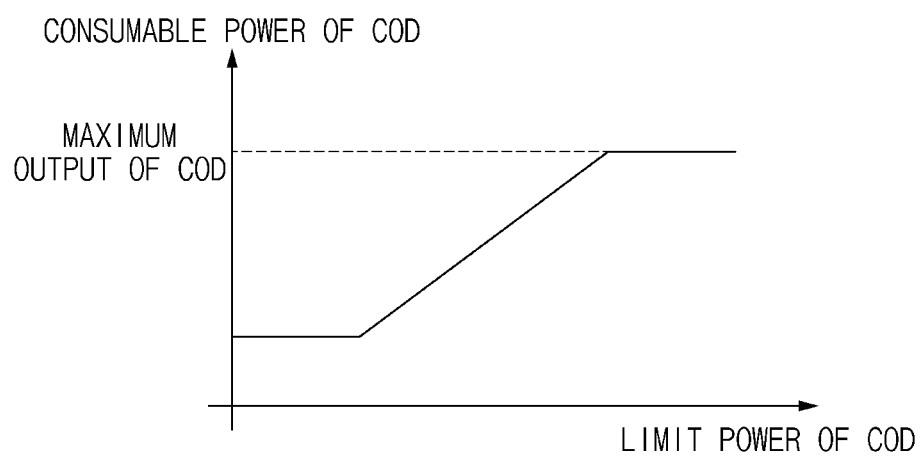
FIG. 9 is a diagram for describing a relationship between limit power of the COD heater and consumable power of the COD heater.

FIG. 9 is a diagram for describing a relationship between limit power of the COD heater and consumable power of the COD heater.

Referring to FIG. 9, the processor 500 may calculate consumable power of the COD heater 420 in proportion to limit power of the COD heater 420. The consumable power may mean power to be consumed by the COD heater 420 among power generated by regenerative braking.

The processor 500 may calculate the consumable power of the COD heater 420 in the same way as the limit power of the COD heater 420.

Alternatively, the processor 500 may set the consumable power of the COD heater 420 to be high as the limit power of the COD heater 420 increases. For example, the processor 500 may set the consumable power of the COD heater 420 to be linearly proportional to the limit power of the COD heater 420. Alternatively, the limit power of the COD heater 420 and the consumable power of the COD heater 420 may have a non-linear relationship.

Moreover, when the limit power of the COD heater 420 is not greater than a specific level, the consumable power of the COD heater 420 may be set to a fixed level. Furthermore, the consumable power of the COD heater 420 may be set to be less than or equal to a predetermined maximum output.

In S406, the processor 500 may generate the RPM of the CSP 30 and an opening degree command of the CTV 60.

Because procedure S406 is included in a procedure for performing regenerative braking, the output of the fuel cell stack 100 may not be required. Accordingly, the processor 500 may control the opening degree of the CTV such that a flow path is completely opened in a direction toward the COD heater 420. For example, as shown in FIG. 7, the processor 500 may control the opening degree of the CTV at the level of C_open.

The CSP 30 may be variably controlled in response to the output consumed by the COD heater 420.

In S407, the processor 500 may consume regenerative braking energy through the COD heater 420 based on consumable power.

To this end, the processor 500 may control the turn-on duty of the IGBT switch 410. For example, in case of the maximum output of the COD heater 420, the duty of the IGBT switch 410 may be set to 100(%). Besides, as the consumable power of COD is smaller, the turn-on duty of the IGBT switch 410 may be set to be smaller.

In S408, the processor 500 may increase the power consumed by the CSP 30 based on the fact that the limit power of the COD heater 420 is less than the threshold power.

The threshold power may be set as the limit power having a small level, at which it is impossible to consume regenerative braking energy by using the COD heater 420. As such, when it is impossible to consume regenerative braking energy by using the COD heater 420 because the limit power of the COD heater 420 is very small, the regenerative braking energy may be consumed by using other auxiliary machinery.

For example, the processor 500 may increase the RPM of the CSP 30.

In S409 and S410, when the discharge capacity of the high voltage battery 320 is not less than a predetermined threshold value, the processor 500 may close the ACV 10. Accordingly, a flow path through which air is provided from the ACP 20 to the fuel cell stack 100 may be blocked.

In S411, the processor 500 may check the opening degree of the ACV 10 again to determine whether the ACV 10 is closed.

In S412, when the degree of ACV opening is not greater than the threshold value, the processor 500 may increase the RPM of the ACP 20.

The processor 500 may consume regenerative braking energy through the ACP 20 by increasing the RPM of the ACP 20.

Because S412 proceeds after a path of the ACV 10 is closed, air may be supplied to the fuel cell stack 100, and thus drying out of the fuel cell stack may be prevented.

In addition, because S412 proceeds when the discharge capacity of a battery is sufficient through S409, it is possible to prevent deterioration of driving comfort due to the output voltage delay of the fuel cell stack 100 at a point in time when regenerative braking is released.

Figure 10:
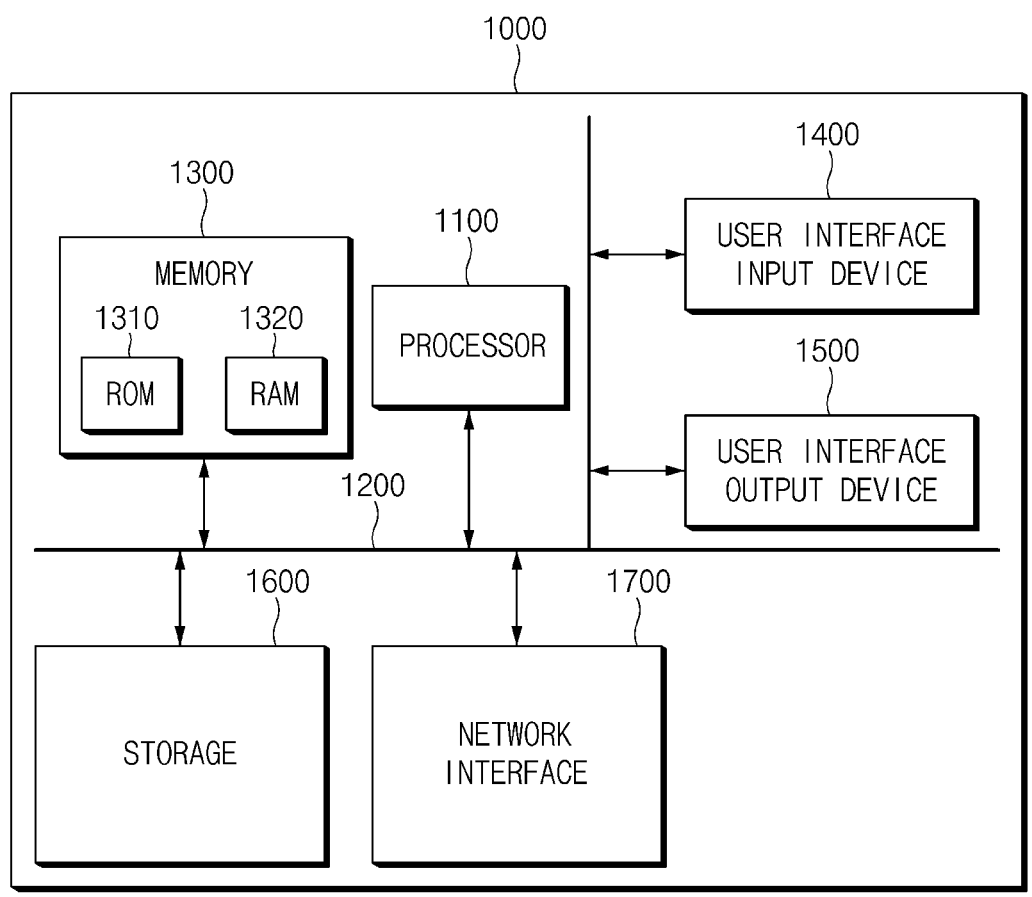
FIG. 10 is a block diagram illustrating a computing system according to an embodiment of the present disclosure.

FIG. 10 illustrates a computing system according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Moreover, the processor 1100 may perform all or part of operations of the processor 500 shown in FIG. 1. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications and modifications may be made by one skilled in the art without departing from the essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

According to the regenerative braking control apparatus of a fuel cell vehicle, and a method therefor according to an embodiment of the present disclosure, overcharging of a battery due to regenerative braking energy may be prevented in consideration of a driving situation including an expected driving path, and excessive use of a COD heater may be prevented in advance.

According to the regenerative braking control apparatus of a fuel cell vehicle, and a method therefor according to an embodiment of the present disclosure, the amount of power consumed by the COD heater may be flexibly adjusted in response to the consumable power of the COD heater by using a switch implemented as an insulated-gate-bipolar-transistor.

According to the regenerative braking control apparatus of a fuel cell vehicle, and a method therefor according to an embodiment of the present disclosure, the operational safety of the COD heater may be secured by consuming regenerative braking energy through the COD heater in response to the limit power consumed by the COD heater.

Besides, a variety of effects directly or indirectly understood through the specification may be provided.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A regenerative braking control apparatus for a vehicle, the apparatus comprising:
   a fuel cell stack configured to provide energy to a driving motor of the vehicle;
   a cathode oxygen depletion (COD) heater configured to remove gas remaining in the fuel cell stack;
   a high voltage battery configured to supply power to the driving motor or to be charged by using power generated by the driving motor through regenerative braking; and
   a processor configured to:
      calculate a reference state-of-charge (SOC) based on an expected driving route;
      calculate a limit power for the COD heater based on an operating state of a cooling device for cooling the COD heater when a SOC of the high voltage battery is greater than or equal to the reference SOC; and
      calculate consumable power of the COD heater based on the limit power of the COD heater.

2. The apparatus of claim 1, wherein the processor is configured to calculate the reference SOC based on a descending section of a road within a predetermined unit section on the expected driving route and a slope of the descending section.

3. The apparatus of claim 1, wherein the processor is configured to calculate the reference SOC based on a change amount of regenerative braking energy during a predetermined first unit time.

4. The apparatus of claim 1, wherein the processor is configured to use a change in the SOC of the high voltage battery during a predetermined second unit time.

5. The apparatus of claim 1, wherein the processor is configured to calculate the limit power to be low as a coolant temperature of the cooling device decreases.

6. The apparatus of claim 5, wherein the processor is configured to calculate the limit power to be high as a coolant amount provided to the COD heater increases.

7. The apparatus of claim 6, wherein the processor is configured to calculate the limit power to be high in proportion to revolutions per minute (RPM) of a coolant pump of the cooling device.

8. The apparatus of claim 1, wherein the processor is configured to:
   calculate the consumable power of the COD heater in proportion to the limit power when the limit power of the COD heater is greater than or equal to a predetermined threshold value, and
   consume power generated by the regenerative braking within a range of the consumable power through the COD heater.

9. The apparatus of claim 8, wherein the processor is configured to drive the cooling device to increase cooling intensity in proportion to the consumable power.

10. The apparatus of claim 8, wherein the processor is configured to increase revolutions per minute (RPM) of a coolant pump that controls a coolant flow path of the COD heater when the limit power of the COD heater is less than the threshold value.

11. The apparatus of claim 10, wherein the processor is configured to close a flow path between the fuel cell stack and an air compressor and increases RPM of the air compressor when the limit power of the COD heater is less than the threshold value.

12. A regenerative braking control method for a fuel cell vehicle, the method comprising:
   calculating a reference state-of-charge (SOC) based on an expected driving route;
   calculating a limit power of a cathode oxygen depletion (COD) heater based on an operating state of a cooling device for cooling the COD heater when a SOC of a high voltage battery is greater than or equal to the reference SOC; and
   calculating consumable power of the COD heater based on the limit power of the COD heater.

13. The method of claim 12, wherein calculating the reference SOC comprises using a descending section of a road within a predetermined unit section on the expected driving route and a slope of the descending section.

14. The method of claim 12, wherein calculating the reference SOC comprises using a change of regenerative braking energy during a predetermined first unit time.

15. The method of claim 12, wherein calculating the reference SOC comprises using a change in the SOC of the high voltage battery during a predetermined second unit time.

16. The method of claim 14, wherein calculating the limit power includes calculating the limit power to be low as a coolant temperature of the cooling device decreases.

17. The method of claim 16, wherein calculating the limit power further includes calculating the limit power to be high as a coolant amount provided to the COD heater increases.

18. The method of claim 17, wherein calculating the limit power further includes calculating the limit power to be high in proportion to revolutions per minute (RPM) of a coolant pump of the cooling device.

19. The method of claim 12, wherein calculating the consumable power of the COD heater comprises:
   calculating the consumable power of the COD heater in proportion to the limit power when the limit power of the COD heater is greater than or equal to a predetermined threshold value, and
   after calculating the consumable power, consuming power generated by regenerative braking within a range of the consumable power through the COD heater.

20. The method of claim 19, further comprising increasing RPM of a coolant pump that controls a coolant flow path of the COD heater when the limit power of the COD heater is less than the threshold value.

* * * * *